US006401121B1

(12) United States Patent
Yoshida et al.

(10) Patent No.: US 6,401,121 B1
(45) Date of Patent: *Jun. 4, 2002

(54) FILE SERVER LOAD DISTRIBUTION SYSTEM AND METHOD

(75) Inventors: Hiroshi Yoshida; Tatsuji Munaka, both of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/749,499

(22) Filed: Nov. 15, 1996

(30) Foreign Application Priority Data

Dec. 26, 1995 (JP) .............................. 7-338806

(51) Int. Cl.[7] ........................ G06F 15/16; G06F 15/177
(52) U.S. Cl. ...................................... 709/227; 709/105
(58) Field of Search ...................... 395/182.02, 182.04, 395/182.16, 200.31, 200.33, 200.47, 200.48, 200.49, 200.65, 200.72, 200.7, 200.74, 674, 675, 728, 729, 730, 731, 732, 651; 707/8, 201, 10

(56) References Cited

U.S. PATENT DOCUMENTS

| | | | | |
|---|---|---|---|---|
| 3,702,006 A | * | 10/1972 | Page .............................. 444/1 |
| 5,155,851 A | | 10/1992 | Krishnan |
| 5,163,131 A | * | 11/1992 | Row et al. ................... 395/200 |
| 5,239,649 A | * | 8/1993 | McBride et al. ............. 395/650 |
| 5,299,313 A | * | 3/1994 | Petersen et al. ............. 395/200 |
| 5,386,545 A | * | 1/1995 | Gombos, Jr. et al. ....... 395/575 |
| 5,404,515 A | * | 4/1995 | Chasse et al. ............... 709/106 |
| 5,444,848 A | * | 8/1995 | Johnson, Jr. et al. ........ 709/106 |
| 5,479,404 A | * | 12/1995 | Francois et al. ............... 370/84 |
| 5,483,468 A | * | 1/1996 | Chen et al. .............. 364/551.01 |
| 5,537,542 A | * | 7/1996 | Eilert et al. ............. 395/184.01 |
| 5,544,327 A | * | 8/1996 | Dan et al. ..................... 709/231 |
| 5,548,724 A | | 8/1996 | Akizawa et al. |
| 5,583,995 A | * | 12/1996 | Gardner et al. ............. 709/231 |
| 5,596,720 A | * | 1/1997 | Hamada et al. ........ 395/200.03 |
| 5,603,029 A | * | 2/1997 | Aman et al. ................. 709/105 |
| 5,649,185 A | * | 7/1997 | Antognini et al. .......... 395/609 |
| 5,668,986 A | * | 9/1997 | Nilsen et al. ................ 395/610 |
| 5,745,758 A | * | 4/1998 | Shaw et al. .................. 395/672 |
| 5,768,681 A | * | 6/1998 | Dan et al. ....................... 725/92 |
| 5,774,668 A | | 6/1998 | Choquier et al. ....... 395/200.53 |
| 5,802,301 A | * | 9/1998 | Dan et al. ..................... 709/226 |
| 5,881,238 A | * | 3/1999 | Aman et al. ................. 709/226 |
| 5,915,095 A | * | 6/1999 | Miskowiec .................. 709/223 |
| 6,047,309 A | * | 4/2000 | Dan et al. .................... 709/203 |

OTHER PUBLICATIONS

Lougher et al.; "Scalable Storage Servers for Digital Audio and Video"; Storage and Recording Systems, Apr. 5–7, 1994, IEE Conference.*

(List continued on next page.)

Primary Examiner—Mark H. Rinehart
Assistant Examiner—Marc D. Thompson
(74) Attorney, Agent, or Firm—Rothwell, Figg, Ernst & Manbeck

(57) ABSTRACT

A load distribution system includes a plurality of servers, each having a memory device in which are stored a plurality of data files for transmission to a plurality of client stations, and a control server which is connected to the plurality of servers for controlling the distribution of transmission requests from client stations as loads on the servers by acquiring transmission counts for data files that are transmitted by the plurality of servers, and determining which server should respond to a transmission request as a data transmission server based on which server has a transmitted data count which is the smallest.

19 Claims, 6 Drawing Sheets

OTHER PUBLICATIONS

Lougher, et al.; "The Impact of Digital Audio and Video on High–speed Storage"; 1994 Thirteenth IEEE Symposium on Mass Storage Systems.*

"Single System Image and Load Balancing for Network Access to a Loosely Coupled Complex", IBM Technical Disclosure Bulletin, vol. 34, No. 9, Feb. 1, 1992, pp. 464–467.

"Bandwidth Management and Congestion Control in plaNET", Cidon et al., IEEE Communications Magazine, vol. 29, No. 10, Oct. 1991, ISSN 0163–6804, pp. 54–64.

* cited by examiner

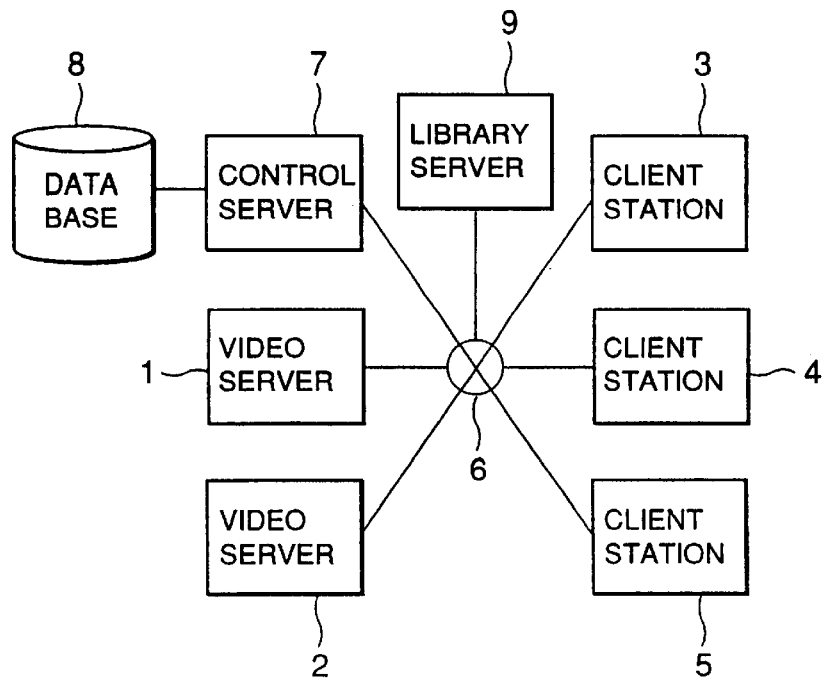
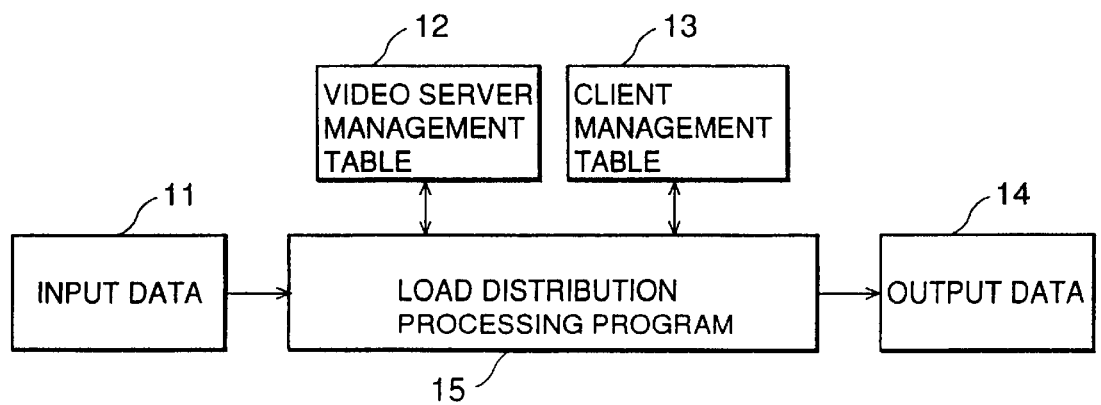

FIG.3

| SERVER NAME | MAXIMUM TRANSMISSION COUNT | CURRENT TRANSMISSION COUNT | MAXIMUM BAND WIDTH | CURRENT BAND WIDTH | TOTAL DISK CAPACITY | MAXIMUM SAME FILE TRANSMISSION COUNT |
|---|---|---|---|---|---|---|
| 21 | 22 | 23 | 24 | 25 | 26 | 27 |
| | | | | | | |

FIG.4

| 31 | 32 | 33 | 34 | 35 | 36 | 37 |
|---|---|---|---|---|---|---|
| CLIENT NAME | FILE NAME | FILE SIZE | REQUIRED BAND WIDTH | MAXIMUM TRANSMISSION COUNT | SERVER NAME | OPERATION CONTENTS |
|  |  |  |  |  |  |  |

FILE SERVER LOAD DISTRIBUTION SYSTEM AND METHOD

BACKGROUND OF THE INVENTION

1. Field of the Invention

The invention relates to a load distribution system that distributes loads to a plurality of file or data servers that transmit files or data that are requested by user or client stations, and to a method of load distribution for such systems.

2. Description of the Related Art

FIG. 7 shows a conventional video server system that comprises, for example, two video servers (server 1 and server 2), three client stations 3–5, and a network connection device 6. While the following description is made with reference to a video server system for purposes of illustration, it is to be noted that the problems encountered are applicable to any type file or data server system.

Conventionally, a client desiring a particular video file would directly select a video server through network connection device 6 and send a request to that video server for the transmission of the video file. However, if the load placed on the video server is already at maximum capacity, the client station cannot connect to it. For example, when all the clients 3, 4 and 5 request the transmission of a video file that is available only from the video server 1, the loads for the three clients are placed only on the video server 1, while no transmission load is placed on the video server 2. If the number of clients on the network exceeds the load capacity of the video server 1 and all these clients request the transmission of the same video file, the transmission capability of the video server 1 is exceeded, and the transmission of data by the video server 1 then becomes impossible.

Even when the same video file is available at both video servers 1 and 2, so long as selection of specific video servers is left to the client stations, all loads may accumulate at a single video server.

Given the arrangement of such a conventional video server, a problem that has arisen is that transmission requests from client stations tend to be directed to only one specific video server and thus all loads are placed on that server. Further, this problem cannot be resolved merely by increasing the number of video servers.

The client stations may perform a process for distributing loads over a plurality of video servers. However, in order to do this, all the client stations must have information regarding the load states at the individual video servers, and if the distribution of server loads is performed by the client stations, processing time at the client stations and the load placed on the network will be increased.

When a specific video file is frequently employed, the video file may be copied to a plurality of video servers in order to increase the transmission throughput for the video file in the system. However, if such copying is performed many times, available disk space is reduced, and video files that are less frequently used must be deleted to free up disk space. Consequently, a problem has arisen in that additional manpower is required for the accomplishment of management functions, such as the copying and deletion of files.

SUMMARY OF THE INVENTION

This invention solves the above-described problems. It is one object of the invention to provide a load distribution system for a plurality of servers whereby the loads placed on CPUs and networks, and the number of disk accesses or the loads placed on the disk-accessing capacities of the servers are distributed. It is another object of the invention to provide a method for load distribution over a plurality of servers to eliminate the problems encountered with the conventional systems.

A load distribution system according to one aspect of the invention comprises a plurality of servers, each having a memory device which stores data sets, for transmitting the data sets to a plurality of client stations; and a control server connected to the plurality of servers, the control server including a calculation device for acquiring a count of data sets that are transmitted by the plurality of servers, and a determination device for receiving transmission requests from the plurality of client stations, and for selecting, as a data transmission server, that server for which a transmitted data set count, which is acquired by the calculation device, is smallest among all the servers.

A load distribution system according to another aspect of the invention comprises a control server which includes a calculation device for calculating bandwidths that indicate a bit count per unit of time for data that are transmitted by each of the plurality of servers, and a determination device for receiving from the client stations transmission requests for the data, and for selecting, as a data transmission server, that server which has, for the bandwidths that are acquired by the calculation device, a sum that is smallest among all the servers.

According to yet another aspect of the invention, a load distribution method for a plurality of data servers includes a calculation step of acquiring counts of data that are transmitted by the servers to client stations, and a decision step of receiving transmission requests for the data from the client stations, and selecting as a data transmission server that server for which a count of data that are transmitted is smallest.

A load distribution method according to still another aspect of the invention comprises a calculation step of acquiring bandwidths that each indicate a bit count per unit of time for data that are transmitted to client stations by a plurality of servers, and a decision step of receiving transmission requests for the data from the client stations, and selecting, as a data transmission server, a server that has a bandwidth sum that is smallest.

Other objects and advantages of this invention will become apparent from the detailed description given hereinafter. It should be understood, however, that the detailed description and specific embodiment are given by way of illustration only since various changes and modifications within the spirit and scope of the invention will become apparent to the those skilled in the art from this detailed description.

BRIEF DESCRIPTION OF THE DRAWINGS

FIG. 1 is a diagram illustrating the structure of a load distribution system according to a first preferred embodiment;

FIG. 2 is a diagram illustrating the structure of a control server according to the embodiment of FIG. 1;

FIG. 3 is a diagram illustrating the contents of a video server management table according to the embodiment of FIG. 1;

FIG. 4 is a diagram illustrating the contents of a client management table according to the embodiment of FIG. 1;

DESCRIPTION OF PREFERRED EMBODIMENTS

Figure 5:
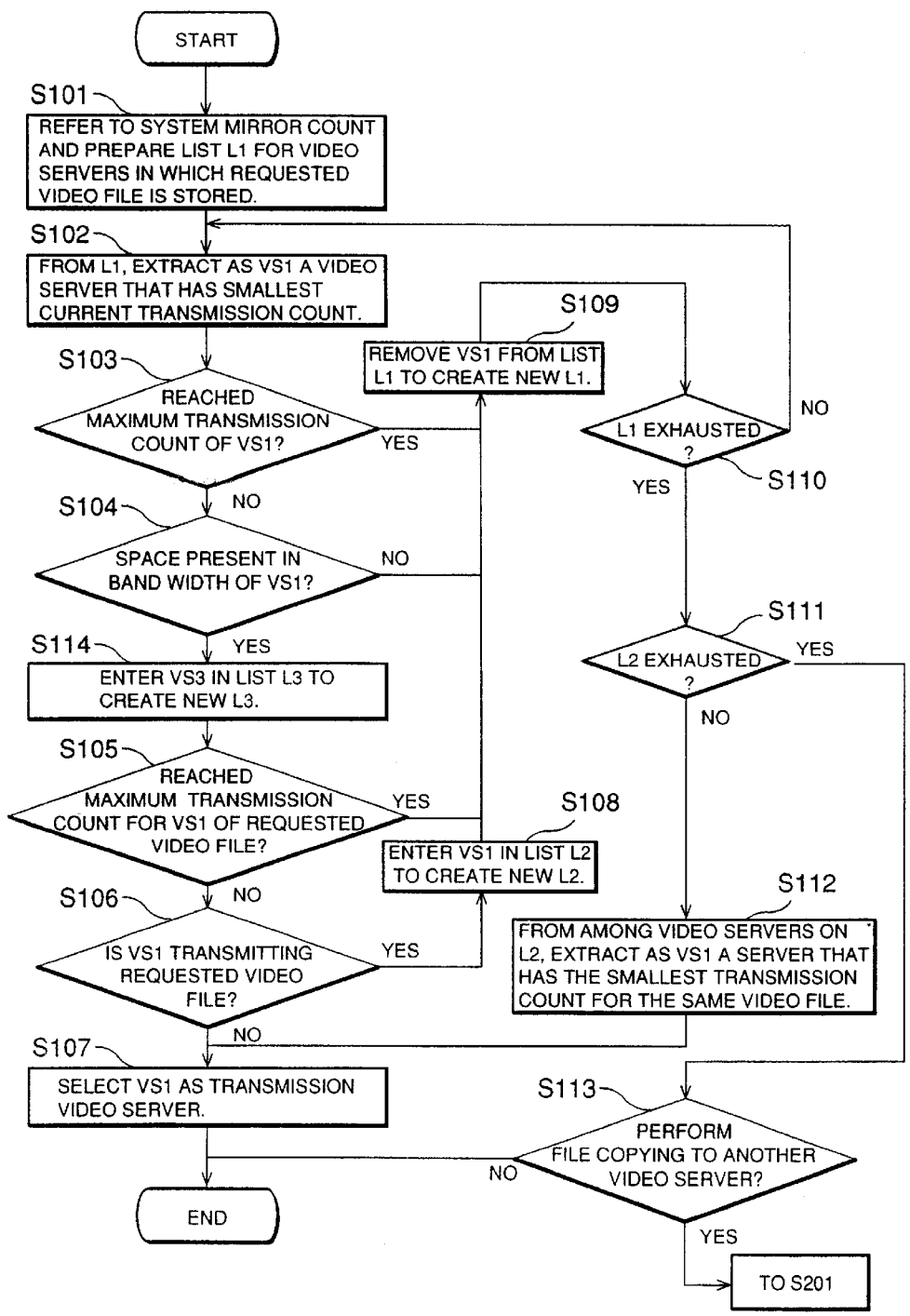
FIG. 5 is a flowchart of load distribution processing for a load distribution processing program according to the embodiment of FIG. 1.

A preferred embodiment of the invention will now be described with reference to the drawings.

FIG. 1 is a block diagram illustrating the arrangement of a load distribution system according to a first preferred embodiment. The load distribution system includes two video servers 1 and 2, client stations 3, 4 and 5, a network connection device 6, a control server 7, a database 8, and a library server 9. Each video server has a memory (such as a disk drive, for example) in which are stored video data in a specified format such as video files, and the server transmits video data that are requested by client workstations. Client stations 3, 4 and 5 request transmission of video data. Network connection device 6 provides communication links between the servers and client stations. Control server 7 receives transmission requests from the client stations, and selects one of the video servers 1 and 2 for the transmission of requested data taking into account the current and future loads on the video servers 1 and 2. Database 8 stores an access history of transmission requests that the control server 7 has received, and also stores default values for the system. Library server 9 has a secondary memory device with a large memory capacity, and stores in the secondary memory device video files that are deleted at the video servers.

The video servers and the client stations may be provided in any desired number, two video servers and three client stations being shown in FIG. 1 solely for purposes of explanation. The network connection device and protocol may be implemented in any suitable manner so long as the client stations, video servers and control server 7 can communicate with each other.

FIG. 2 is a block diagram illustrating the structure of the control server 7. The control server 7 receives input data, which contain transmission request data such as a requested video file name, from the client stations 3 through 5, and stores the data in a buffer 11. A video server management table 12 stores data concerning various parameters of video servers 1 and 2. A client management table 13 stores data concerning various parameters of client stations 3 through 5. Output data sent to output buffer 14 indicates which one of the video servers 1 and 2 has been selected. A load distribution processing program 15 performs load distribution processing to select the optimal video server 1 or 2 consonant with the input data 11. The input data 11, the video server management table 12, the client management table 13 and the output data 14 are stored in the memory of the control server 7. In consonance with the input data, such as a requested video file name, that is acquired from the input data buffer 11, and the data in the video server management table 12, the client management table 13 and the database 8, the current operational states of the video servers 1 and 2 and data concerning the requested video file are obtained by the load distribution program to determine the optimal video server 1 or 2 for processing the request, and indicates the optimal video server in the output data 14. The load distribution processing program 15 thus functions to calculate and determine the optimal video server based on the content of the input data, the video server management table, and the client management table.

The data contained in the input data 11 may be only a requested video file name. However, static data that are stored in the database 8, e.g., mirror data and the bandwidth of a video file to be transmitted, may also be stored in the input data area 11 to reduce accesses to the data base 8 by the load distribution processing program 15 to a minimum.

FIG. 3 is a diagram showing an example of the contents of the video server management table 12. The load distribution processing program 15 refers to these values when performing processing. Reference numeral 21 denotes names of the video servers that exist in the system (1 and 2 in the exemplary embodiment); reference numeral 22 denotes the maximum transmission counts of the video servers; reference numeral 23 denotes the number of current transmissions by the video servers; reference numeral 24 denotes the maximum bandwidths of the video servers; reference numeral 25 denotes the bandwidths being employed by the video servers for the current transmission; reference numeral 26 denotes the total disk capacities of the video servers; and reference numeral 27 denotes the maximum simultaneous transmission counts for the files of the video servers.

Since the video server names 21, the maximum transmission counts 22, the maximum bandwidths 24, the total disk capacities 26, and the maximum simultaneous transmission counts 27 are static data that are specified in advance, they may be set in the management table 12 by reading them from the database 8 at the time of initialization of the control server 7. The current transmission count 23 and the bandwidths 25 that are currently being used are dynamic data that are updated in accordance with transmission requests from the client stations 3 through 5. When a transmission request from one of the client stations is processed and a specific video server is selected for data transmission, the transmission count 23 and the current bandwidth 25 for the specific video server are updated in table 12.

FIG. 4 is a diagram showing an example of the contents of the client management table 13. The load distribution processing program 15 also refers to these values when performing processing. Reference numeral 31 denotes the client names of the client stations that are connected to the control server 7 through the network connection device; reference numeral 32 denotes file names of target video files; reference numeral 33 denotes a file size of the target video file; reference numeral 34 denotes a bandwidth that is required for transmitting the target video file; reference numeral 35 denotes a maximum transmission count of the video file; reference numeral 36 denotes the name of a video server that is a current target; and reference numeral 37 denotes current operational contents.

Each time an operation by one of the client stations 3 through 5 occurs, the operational contents 37 are updated in order to store operating requests from the client stations. The other data are not updated so long as a target file is unchanged.

FIG. 5 is a flowchart explaining the processing performed by the load distribution processing program 15 of the control server 7. The process is performed when one of the client stations 3 through 5 requests that the control server 7 transmit a specific video file. In this process, a particular video server is designated as a transmission video server for which the current transmission count 23 is less than the maximum transmission count 22, for which there is sufficient space in the bandwidth of the network, and for which the current transmission count of the requested video file is smaller than the maximum transmission count which is set at that video server. When the sum of the bandwidth 25 which is being used and the required bandwidth 34 for the requested video file is smaller than the maximum bandwidth 24, it is determined that space is available in the bandwidth of the network for transmission of the requested video file.

The detailed process will now be explained. First, at step S101, the video servers in which a requested video file is stored are placed on list L1 in the memory. Then, at step S102, the current transmission counts 23 of the video server management table 12 are referred to, and whichever video server on list L1 has the smallest current transmission count is selected.

For the selected video server (hereinafter referred to as VS1) at step S102, at the following step S103 the video server management table 12 is referred to and a check is performed to determine whether or not the current transmission count 23 has reached the maximum transmission count 22. If the determination at step S103 is no, processing goes on to step S104, in which a check is performed to determine whether or not there is sufficient space in the bandwidth of the network. If the check at step S103 indicates that the current transmission count for VS1 is at least a predetermined number below the maximum transmission count, and the check at step S104 indicates that a predetermined minimum bandwidth is available for VS1, VS1 is added to a third list L3 at step S114.

If there is sufficient space in the bandwidth as determined at step S104, at step S105 the current transmission count 23 for the requested video file is acquired by referring to the video server management table 12, and a determination is made whether or not the number of transmissions of the requested video file to have reached the maximum transmission count 27. If not, processing goes to the next step S106 in which a check is performed to determine whether the requested video file is already being transmitted, by referring to client management table 13. If not, the process proceeds to step S107, where video server VS1 is designated as a transmission video server. If it is determined that the requested file is being transmitted at step S106, the server VS1 is entered in a second list L2 of video servers currently transmitting the requested video file.

If the results of steps S103, S104, S105 or S106 are adverse, the server VS1 is not permitted to transmit the requested video file. At step S109, the selected server VS1 is removed from the list L1, and the list from which the VS1 server has been deleted is regarded as a new list L1. At step S110, it is determined whether the list L1 has been exhausted, i.e., whether no video servers remain on the list. If not, the process goes back to step S102 where a new VS1 is selected for further processing.

If the list L1 is determined to be empty at step S110, the process goes to step S111 where it is determined whether the list L2 is exhausted. If not, at step S112 the video server on list L2 with the smallest transmission count for the requested video file is selected as a new VS1, and at step S107, the VS1 server is designated as the transmission server. If the list L2 is empty, processing proceeds to step S113 where it is determined whether the requested video file should be copied to another video server. The reference information for this determination can be contained either in a transmission request, or may be part of the setup contents of the system. Thus, the optimal load distribution for a particular file can be set either for each request or for the entire system. If it is determined that the requested video file should be copied to another server, processing proceeds to step S201, which will be explained below in connection with the flow chart of FIG. 6. In this regard, the list L3 is consulted for the optimal video server to which to copy the video file. If it not determined to copy the requested file to another server, the process ends, and the client must wait to request the video file at a later time.

It should be noted that the maximum transmission count 22 of the VS1 is not the limit of the ability of the VS1. Rather, at the time of the system setup, a theoretical upper limit value, which is smaller than the maximum transmission count consonant with the limit of the ability of the VS1, is set in advance in the database 8, and is defined as the maximum transmission count 22. When it is possible to perform processing during which the theoretically maximum transmission count 22 for the VS1 will be exceeded, e.g., copying at the time of the maximum transmissions, the load distribution processing can be then performed smoothly.

Similarly, for the maximum bandwidth 24 of the network, a theoretical upper limit smaller than the actual limit is set in advance in the database 8, so that the load distribution processing can be smoothly performed. The setup values of the maximum transmission count 22 and the maximum bandwidth 24 are read into the video server management table 12 when the load distribution processing program 15 is initialized.

Figure 6:
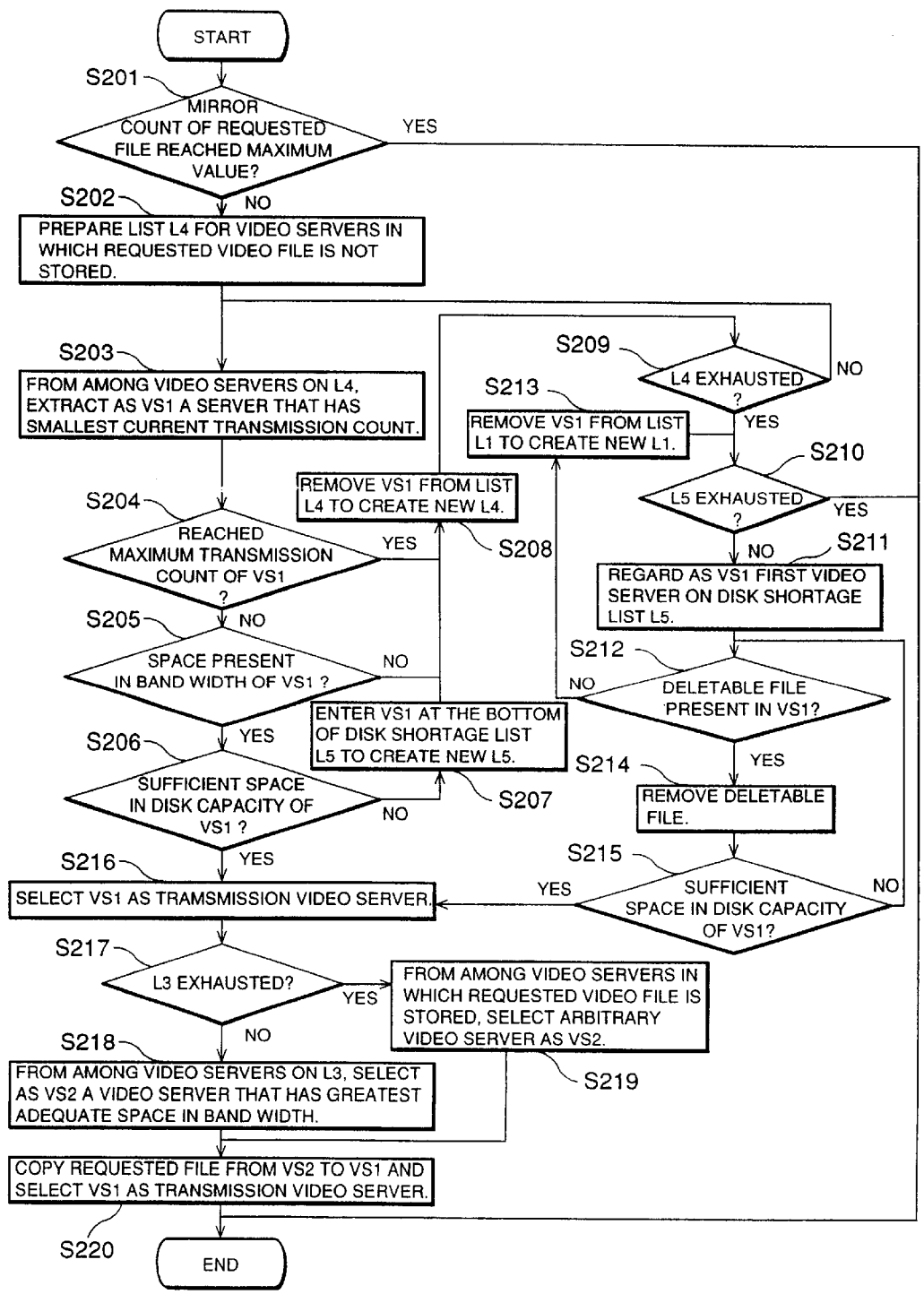
FIG. 6 is a flowchart of file copying processing for the load distribution processing program according to the embodiment of FIG. 1.
Figure 7:
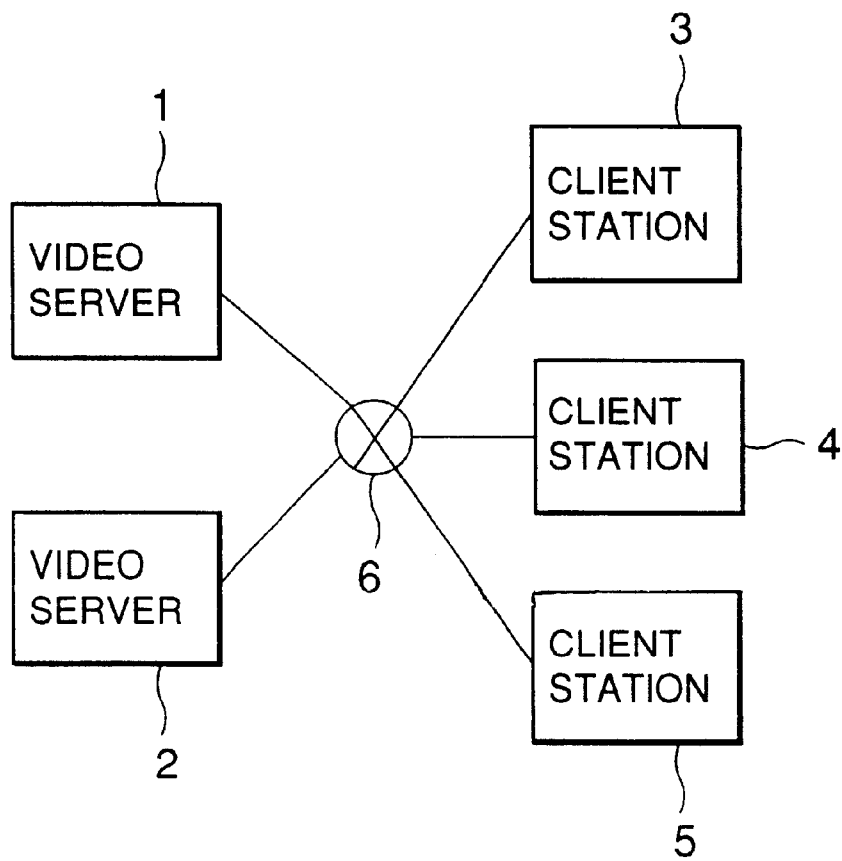
FIG. 7 is a diagram illustrating the structure of a conventional video server system.

An explanation will now be given of the flowchart process of FIG. 6. FIG. 6 shows a file load distribution process for performing a file copy, for which the distribution of the load on the disk capacity of the system is also taken into consideration.

In this processing, a requested video file is copied to a video server for which the loads on the transmission and on the disk capacity are smaller than those of the others and in which the requested video file does not exist, and is transmitted from that video server, when all the video servers in which the video file requested for transmission have a high load. When a requested video file is present in all of the video servers, file copying is not required and this processing is not performed.

The file load distribution processing takes into account mirror data, which indicates how many video servers each video file is stored within, and a maximum mirror count, which is set in advance for each video file in the system. The mirror data and the maximum mirror count are stored in advance in the database 8. Any format may be used for the mirror data so long as a current mirror count and a video server that is mirrored can be confirmed. The list of current mirror counts and a list of corresponding video servers may be stored separately.

According to the form employed in this embodiment, the mirror data is a bit flag indicating a video server, and the current mirror count is found by counting the flags. The maximum mirror count is merely a value. The mirror data and the maximum mirror count may be acquired directly from the database 8, or may be acquired from input data.

First, at step S201, by referring to the mirror data for a requested video file, it is confirmed in how many video servers the requested video file is stored, and a check is performed to determine whether or not the obtained mirror data value exceeds the maximum mirror count for the requested video file. If it is found that the current mirror data value for the requested video file has reached the maximum mirror count, program control branches to "Yes" and the processing is thereafter terminated. If the current mirror data value has not reached the maximum mirror count, program control branches to "No" and copying or mirroring can be performed.

At step S202, a list L4 is prepared for the video servers in which the requested video file is not stored. It should be noted that the load distribution processing program prepares list L4 in the memory.

Then, at step S203, the current transmission counts 23 in the video server management table 12 are referred to, and the video server that has the smallest current transmission count is selected from the list L4 and regarded as the VS1. If, at step S204, it is determined that the current transmission count 23 for the VS1 has reached the maximum transmission count 22 ("Yes"), or if, even when the result is "No", at step S205 it is determined that there is insufficient space in the currently unused bandwidth of the network ("No"), at the following step S208, the VS1 server is removed from the list L4 and the revised list is determined to be a new list L4.

When, at step S204, the current transmission count 23 of the VS1 has not reached the maximum transmission count 22 ("No"), and when, at step S205, there is sufficient space in the currently unused bandwidth ("Yes"), at step S206, the amount of free disk space is requested from the VS1 to confirm the free disk space of the VS1. When a sufficient area on the disk is available to which a requested video file can be copied ("Yes"), at step S216 the VS1 is designated as a transmission video server.

On the other hand, if, at step, S206, the disk capacity is not sufficient ("No"), or when the unused disk capacity of the video server VS1 exceeds the upper limit of the disk capacity that is set in advance, at step S207 it is assumed that the VS1 can be a transmission video server if the unused disk capacity can be acquired, and the VS1 is added as the last entry of a disk shortage list L5.

The VS1 is added as the last entry in the list L5 for the reason that since the video servers are selected in ascending order according to a current transmission count, they are also arranged on the list L5 in ascending order according to the current transmission count, so that the video server that has the smallest current transmission count can be sequentially extracted from the top of the list L5 and the amount of processing that is required can be reduced.

When at step S208 the list L4 is updated, at step S209, a check is performed to determine whether or not the list L4 has been exhausted. When the list L4 has not been exhausted ("No"), program control returns to step S203, and the above process is repeated until, at step S216, the transmission video server VS1 is designated, or until, at step S209, it is ascertained that the list L4 has been exhausted.

If, at step S209, the list L4 has been exhausted ("Yes"), at the following step S210, the disk shortage list L5 is examined. When the list L5 has been exhausted ("Yes"), it is assumed that no video server has been found for designation as a transmission video server and processing is thereafter terminated.

When, at step S210, the list L5 has not been exhausted ("No"), at step S211, the video server from the top of the list L5 is designated as VS1. When, at step S212, it is determined that there is no file that can be deleted from VS1 ("No"), at step S213 the VS1 is deleted from the list L5, the list is updated as a new L5, and program control thereafter returns to step S210.

If, at step S212, there is a file that can be deleted ("Yes"), at step S214 that file is deleted, and at step S215 a check is performed to determine whether or not the free disk space of the video server VS1 is adequate for the copying of the requested video file.

The determination of file deletion depends on the access frequency that is acquired from an access history. The access history is stored in the database 8 when a client requests transmission. At the time of the transmission request, the name of the requesting client station, the date, the file name, the server name and operational contents, for example, are entered as the access history. Thus, the access record for a video file and the load distribution for servers can be acquired.

A video file which is the only file which remains in the system (as determined by using mirror data) is unavailable as a deletion target. However, by referring to the access history, video files that are ascertained to need not exist in the video server, because a long time has elapsed since the last access date, are copied to the library server 9 to retain these files in the system, beginning with the file which has the longest elapsed time since the last access date, and the video files in the video server are deleted so that the required free disk capacity in the video server can be acquired.

When, at step S215, an adequate disk capacity can not be obtained ("No"), program control returns to step S212 and the deletion of unnecessary video files is continued. If, at step S215, an adequate disk capacity has been obtained for copying the requested video file, the VS1 is designated as a transmission video server at step S216.

Sequentially, at step S217, a check is performed to determine whether or not the list L3 has been exhausted in order to decide which video server (hereafter referred to as a VS2) will be a source for the copying. The list L3, which was prepared at step S114, is of the video servers in which a requested video file is stored, that have current transmission counts 23 smaller than the maximum transmission counts 22 for the video servers, and that have sufficient space in the bandwidths of the network. If the list L3 has not been exhausted ("No"), at step S218 the video server on the list L3 that has the most available space in the bandwidth is designated the VS2. When the list L3 has been exhausted ("Yes"), at step S219 an arbitrary video server in which the requested video file is stored is designated as the VS2.

Finally, at step S220, the requested video file is copied from the VS2 server to the VS1 server in order for it to be capable of being transmitted thereafter from the VS1 server. The transmission from VS1 may begin even before the copying from the VS2 to VS1 has been completed, and when transmission is performed in parallel with the copying process, an excellent response for the client stations can be obtained.

Although not specified in this embodiment, there are two ways of using the video server VS1, which is designated by the load distribution processing program 15. One way is where the name of a requesting client and a video file name are transmitted to a designated video server VS1 so as to request the video server VS1 to perform the transmission, and the other way is where a designated video server name is returned to a client station to permit the client to access the video server directly. In this embodiment, either method may be employed.

Further, although the list L1 is prepared at step S101 in this embodiment, since a list of video servers in which a requested video file is stored is known data, the list L1 may be prepared in advance in the database 8.

In addition, although at steps S103, S104, S204 and S205, the transmission count and the bandwidth are referred to in order to determine whether or not transmission can be enabled, only the bandwidth need be referred to for such determination so long as the CPU of a video server is capable of adequate performance, for example, or only the transmission count need be referred to for such determination so long as the bandwidth for the video server is adequate.

Further, although, at step S105 and S106, it is taken into consideration that all the transmissions for the same video file should not be allocated to a specific video server, a transmission load may be distributed without such consideration by referring only to current transmission counts or the current bandwidths of the video servers.

As is described above, according to this embodiment, since the transmission counts of the video servers are averaged, the concentration of transmission requests to a specific file can be prevented and loads are therefore distributed.

In addition, the used disk capacities of the video servers are averaged by copying frequently requested video files to other servers and deleting unused video files from the servers and moving them to an archival library server.

Further, as a video file is copied to another video server when the transmission requests for the video file are frequent, the maximum transmission count for the system relative to the requested file is increased, and adequate service is ensured in response to transmission requests from clients.

Since video files, the number of which is automatically increased by copying, are automatically deleted as the access frequency is reduced, the labor required for system management can be reduced.

As a result of the automatic copying and deletion of video files, copies of a video file that is frequently used is increased, and accordingly, the transmission count for the video file in the system is increased. On the other hand, since the video files that are less frequently used are automatically deleted, the transmission counts for the video files in the system are reduced. Therefore, since the number of copies of the video files, i.e., the transmission counts of the video files, are proportional to their frequency of employment, load distribution in accordance with the disk capacity can be performed in consonance with the frequency of employment.

According to a second embodiment of the invention, the access history for each video server is referred to, and data for load distribution for one day are obtained for each video server. It is anticipated that the load for each video server in the following period will be increased or decreased, and this anticipation can be employed as one reference for determination. For example, determination by using the reference is added at steps S102 and S112 in FIG. 5. If the load on the video server tends to be increased, the video server is removed and a video server for which the current and future transmission count is the smallest is selected. The load anticipation according to the one-day load distribution, which is acquired from the access history, can be employed not only for a transmission video server at the time of load distribution, but also for the two video servers that are concerned during a copying process, so that a smooth copying process can be performed.

The acquisition of the load distribution data is not limited to units of a day, but may be acquired for units of a month, a week, or an hour, and the units can be selected as needed.

Besides the above described reference for determination, an entry for a transmission start time and an entry for a file size can be provided in the client management table 13. The remaining time for a video file that is currently being transmitted is calculated to anticipate a future load, and a video server for which the current and future transmission counts are the smallest can also be selected.

A third embodiment of the invention will now be described. In Embodiment 1, loads are distributed upon receipt of transmission requests for a video file not only by performing the transmission load distribution processing for the purpose of averaging transmission counts, but also by performing file load distribution processing to prevent requests for a specific video file to be directed to a single video server, and disk load distribution processing to average the used disk amounts. When a change in the file configuration of a video server is not desired, the file load distribution and the disk load distribution processing shown in FIG. 6 may be skipped, and only the transmission load distribution processing in FIG. 5 need be performed. Optimal load distribution concerning transmission can be provided by performing only the transmission load distribution processing. It should be noted that, in this case, load anticipation may be performed by using statistical information and the remaining time for a video file that is being transmitted.

According to a fourth embodiment, when a copying operation is to be performed in response to a request from a client, the file load distribution and disk load distribution processing shown in FIG. 6 can also be performed to perform a copying process with no consideration being given to disk capacity. A video server, which is a copy source, is selected directly by a client, or is acquired in the same manner as in the procedure at step S114 for preparing the list L3.

Although video data are employed as an example in the above described embodiments, data are not limited to video data, but may be animation data, static picture data, music data, speech data, text data, etc. Accordingly, the above described video server may be a server that processes data other than video data.

The embodiments of the invention having the above-described structure have the following advantages (1)–(16).

(1) According to a first aspect of the invention, provided are calculation means for acquiring a count of data sets that are transmitted by a plurality of servers, and determination means for receiving transmission requests from clients and for selecting, as a data transmission server, a server for which a transmitted data set count, which is acquired by the calculation means, is smallest. With this arrangement, since the server for which the transmission data count is smallest transmits data, loads can be distributed to a plurality of servers.

(2) According to a second aspect of the invention, provided are calculation means for calculating band widths that indicate a bit count per unit of time for data that are transmitted by each server, and determination means for receiving data transmission requests from clients and for selecting, as a data transmission server, a server that has, for the bandwidths that are acquired by the calculation means, the sum that is the smallest. Since the server for which the sum of the bandwidths is smallest and for which there is space in the bandwidth performs data transmission, loads can be distributed to a plurality of servers.

(3) According to a third aspect of the invention, provided are calculation means for acquiring a transmission count for each data'set that is transmitted by each server, and determination means for selecting, as a data transmission server, a server which is transmitting data that are requested by clients and for which the transmission count is smallest. Since a server that is transmitting data that are requested by clients and for which the transmission count is the smallest performs data transmission, loads can be distributed to a plurality of servers.

(4) According to a fourth aspect of the invention, provided are calculation means for acquiring load records of a plurality of servers from transmission histories for the servers held by a predetermined unit, and determination means for, in consonance with the load records, anticipating loads for the servers up until data transmission is terminated, and for selecting a server for which, as a data transmission server, anticipated loads are lowest. Since load distribution is performed in consonance with load anticipation, loads can be uniformly distributed to the servers.

(5) According to a fifth aspect of the invention, provided are calculation means for calculating a remaining transmission time concerning data that are transmitted by a plurality of servers, and determination means for employing load records that are acquired by the calculation means to anticipate loads up until the remaining transmission time for the data has ended and for selecting a server for which, as a data transmission server, anticipated loads are lowest. Since load distribution is employed to select a data transmission server, a server for which anticipated loads are lowest can be precisely selected.

(6) According to a sixth aspect of the invention, determination means is provided that, when a data transmission server can not be selected, copies data that are requested by clients from a server that stores the data to a server that does not store the data, and selects the server to which the data are copied as a data transmission server. The used disk amount of the individual servers can be averaged.

(7) According to a seventh aspect of the invention, determination means is provided which permits a copy destination server to transmit data copy in parallel with the execution of data copying. Thus, an excellent response can be provided for a client that has requested data transmission.

(8) According to an eighth aspect of the invention, provided is determination means that, as threshold values for copy execution by a plurality of servers, has maximum transmitted data counts and maximum transmission counts of identical data for the servers, and employs the threshold values to determine whether or not data are to be copied. Therefore, frequent copying can be prevented.

(9) According to a ninth aspect of the invention, provided is determination means which has a threshold value, for each item of data, that indicates a maximum count for data copies to be stored, and employs the threshold value to determine whether or not copying of the data is performed. Thus, an increase in the number of files occasioned by copying can be limited.

(10) According to a tenth aspect of the invention, provided is determination means that confirms a remaining capacity for memory devices of a plurality of servers, and determines a server to which data are to be copied in consonance with a remaining capacity. Therefore, the performance of copying to a copy destination server is ensured.

(11) According to an eleventh aspect of the invention, provided are calculation means that acquires a transmission count for each item of data that each server transmits, and determination means that, when a remaining capacity for a memory device of each server is smaller than the size of copied data, deletes data for which a transmission count is small. Since data that are less frequently accessed are automatically deleted, the labor required for system management can be reduced.

(12) According to a twelfth aspect of the invention, provided are a library server having a memory device in which a plurality of data are stored, and determination means for copying data to the library server before deletion of the data. With this arrangement, the data are stored with the library data at least, and an unused memory capacity size for the memory means of each server can be obtained.

(13) According to a thirteenth aspect of the invention, provided are calculation means for acquiring a load record for a predetermined unit of a plurality of servers from transmission histories for the servers, and determination means for, in consonance with the load records, anticipating copying loads for the servers and for selecting as a copy destination server a server that has an anticipated load that is the lowest. Since the anticipated loads are employed to select a copy destination server, the copy destination server can be precisely selected.

(14) According to a fourteenth aspect of the invention, provided are a calculation step of acquiring, for a plurality of servers, counts of data that are transmitted to clients; and a decision step of receiving transmission requests for the data from the clients and of selecting as a data transmission server a server for which a count of data that are transmitted, which is acquired at the calculation step, is the smallest. Since a server for which the transmission data count is the smallest performs data transmission, loads can be distributed to a plurality of servers.

(15) According to a fifteenth aspect of the invention, provided are a calculation step of acquiring bandwidths that each indicate a bit count per unit of time for data that are transmitted to clients by a plurality of servers; and a decision step of receiving transmission requests for the data from the clients and of selecting, as a data transmission server, a server that has, for the bandwidths that are acquired at the calculation step, a sum that is the smallest. Since data transmission is performed by a server for which the sum of bandwidths is the smallest and there is sufficient space in the bandwidth, loads can be distributed to a plurality of servers.

(16) According to a sixteenth aspect of the invention, provided are a calculation step of acquiring a transmission count for data that each server is transmitting, and a decision step of selecting, from among the servers that are transmitting the data that are requested by clients, as a data transmission server a server for which the transmission count for the data is the smallest. Since data transmission is performed by a server that is transmitting the data that are requested by clients and for which the transmission count for the data is the smallest, loads can be distributed to a plurality of servers.

The invention having thus been described with respect to certain preferred embodiments, various modifications and additions within the spirit of the invention will occur to those of skill in the art. Accordingly, the scope of the invention is limited solely by the following claims.

What is claimed is:

1. A load distribution system for distributing as loads transmission requests for selected data files issued by a plurality of client stations, comprising:
   (a) a plurality of servers, each having a memory device in which are stored a plurality of data files, for transmitting requested data files to client stations; and
   (b) a control server connected to said plurality of servers, said control server including
      calculation means for acquiring a count of data file transmission occurrences by each of said plurality of servers, said count being a current number of transmissions executed by a corresponding server, and
      determination means for receiving said transmission requests from said plurality of client stations, and for selecting, as a data transmission server, a server for which a data file transmission count acquired by said calculation means is the smallest.

2. A load distribution system for distributing as loads transmission requests for selected data files issued by a plurality of client stations, comprising:

(a) a plurality of servers, each having a memory device in which are stored a plurality of data files, for transmitting requested data files to client stations; and (b) a control server connected to said plurality of servers, said control server including calculation means for acquiring a transmission count for each of said data files that are transmitted by said plurality of servers, and determination means for receiving said transmission requests from said plurality of client stations, and selecting as a data transmission server, a server for which a transmission count of data files that are requested by said client stations is smallest.

3. A load distribution system for distributing as loads transmission requests for selected data files issued by a plurality of client stations, comprising:

(a) a plurality of servers, each having a memory device in which are stored a plurality of data files, for transmitting requested data files to client stations; and (b) a control server connected to said plurality of servers, said control server including calculation means for acquiring load distribution records of said plurality of servers from stored access histories for said plurality of servers, and determination means for receiving transmission requests from said plurality of client stations, and for anticipating future loads for said plurality of servers in consonance with said load records, and for selecting a server as a data transmission server for which anticipated future loads are lowest.

4. A load distribution system according to claim 3, wherein said calculation means calculates a remaining transmission time for data files being transmitted by said plurality of servers, and wherein said determination means employs said load distribution records to anticipate loads up until said remaining transmission time for said data has ended, and selects as a data transmission server a server for which anticipated loads are lowest.

5. A load distribution system for distributing as loads transmission requests for selected data files issued by a plurality of client stations, comprising:

(a) a plurality of servers, each having a memory device in which are stored a plurality of data files, for transmitting requested data files to client stations; and (b) a control server connected to said plurality of servers, said control server including determination means for receiving said transmission requests from said plurality of client stations, for copying a data file that is requested by said client stations from a server storing said data file to a server that does not contain said data file, and for selecting said server to which said data file is copied as a data transmission server.

6. A load distribution system according to claim 5, wherein said determination means permits said server to which data files are copied to transmit stored data files in parallel with execution of copying of data files to said server.

7. A load distribution system according to claim 5, wherein said determination means uses maximum transmitted data counts and maximum transmission counts of identical data for said plurality of servers as threshold values for copy execution by said plurality of servers, and employs said threshold values to determine whether or not said data files are to be copied.

8. A load distribution system according to claim 5, wherein said determination means uses a threshold value, for each item of said data, that indicates a maximum count for data copies to be stored, and employs said threshold value to determine whether or not copying of said data files is to be executed.

9. A load distribution system according to claim 5, wherein said determination means verifies a remaining storage capacity for each of said memory devices of said plurality of servers, and selects said server to which said data files are to be copied in accordance with said remaining storage capacity.

10. A load distribution system according to claim 9, wherein said control server further comprises calculation means for acquiring a transmission count for each of said data files that each of said plurality of servers transmits, and wherein, when said remaining storage capacity for said memory devices of each of said plurality of servers is smaller than the size of said data file to be copied, said determination means deletes a data file from a selected server for which a transmission count is smallest.

11. A load distribution system according to claim 10, further comprising a library server having a memory device in which a plurality of data files are stored, wherein before deletion of a data file from a selected server said determination means copies that data file to said library server.

12. A load distribution system according to claim 5, wherein said control server further comprises calculation means for acquiring a load distribution record for a predetermined one of said plurality of servers from transmission access histories for said plurality of servers, and wherein, in accordance with said load distribution records, said determination means anticipates loads for said plurality of servers caused by copying operations, and selects as a copy destination server a server that has an anticipated load that is lowest.

13. A load distribution system comprising:

(a) a plurality of servers, each having a memory device in which is stored a plurality of data files, for transmitting said plurality of data files to client stations; and (b) a control server connected to said plurality of servers, said control server including calculation means for calculating a bandwidth that indicates a bit transmission rate per unit of time for data transmitted by each of said plurality of servers, and determination means for receiving from said client stations transmission requests for particular data files, and for selecting a server as a data transmission server which has a bandwidth that is smallest.

14. A load distribution method for distributing requests for data transmission among a plurality of servers, comprising the steps of:

acquiring counts of data that are transmitted to client stations by each of said plurality of servers, each of said counts being a current number of transmissions executed by a corresponding server;

receiving a transmission request for data from said client stations; and selecting as a data transmission server for responding to said transmission request a server for which a data transmission count is smallest.

15. A load distribution method for distributing requests for data transmission among a plurality of servers, comprising the steps of:

acquiring a data transmission count for data being transmitted by each of said plurality of servers;

receiving a transmission request for data from said client stations; and selecting from among said plurality of servers that are transmitting said data that are requested by said client stations, a server for which said transmission count for said data is smallest.

16. A load distribution method for distributing requests for data transmission among a plurality of servers, comprising the steps of:

acquiring bandwidths that each indicate a bit transmission rate per unit of time for data that are transmitted to client stations by said plurality of servers;

receiving transmission requests for said data from said client stations; and selecting a server as a data transmission server which has a bandwidth that is smallest.

17. A load distribution system, comprising:
(a) a plurality of servers, each having a memory device in which is stored a plurality of data files, for transmitting requested data files to a plurality of client stations; and
(b) a control server connected to said plurality of servers, said control server including
calculation means for calculating available space in a bandwidth that indicates a bit transmission rate per unit of time for data transmitted by each of said plurality of servers, and
determination means for receiving from said client stations transmission requests for particular data files, and for selecting as a data transmission server from said plurality of servers a server that has the most available space in said bandwidth.

18. A load distribution method for distributing requests for data transmission among a plurality of servers, comprising the steps of:

acquiring available space in a bandwidth that indicates a bit transmission rate per unit of time for data that are transmitted to a plurality of client stations by each of said plurality of servers;

receiving transmission requests for said data from said client stations; and selecting as a data transmission server from said plurality of servers a server that has the most available space in said bandwidth.

19. A load distribution system according to claim 3, wherein said determination means anticipates whether said future loads will increase or decrease for selecting a data transmission server.

* * * * *